Jan. 17, 1939.  O. V. JENSEN  2,143,947
PROCESS FOR PREVENTING THE INFECTION OF MILK
Filed Nov. 15, 1935
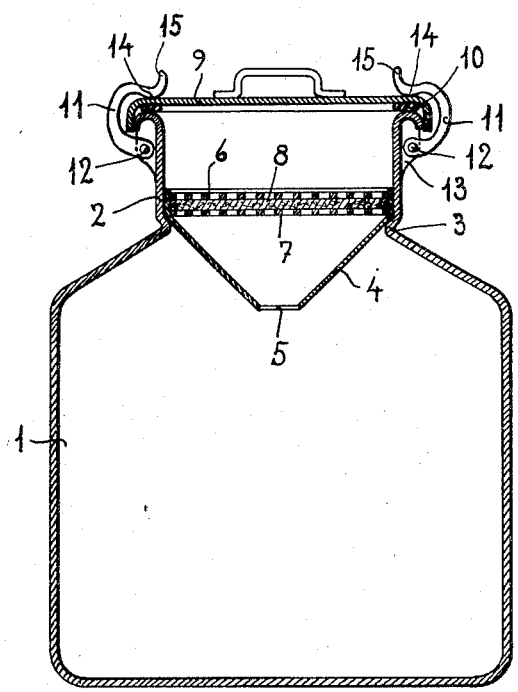
INVENTOR.
O. V. Jensen
By: Glascock Downing Seebold
Attys.

Patented Jan. 17, 1939

2,143,947

UNITED STATES PATENT OFFICE 2,143,947

PROCESS FOR PREVENTING THE INFECTION OF MILK

Orla Vilhelm Jensen, Copenhagen, Denmark, assignor to Jens Grand, Copenhagen, Denmark Application November 15, 1935, Serial No. 50,036
In Denmark October 23, 1935

2 Claims. (Cl. 99—151)

It is a well known fact that milk offers most favourable conditions for the propagation of bacteria and injurious germs, and in order to reduce the development of such bacteria and germs, and consequently improve the keeping qualities of the milk it has been proposed to reduce the temperature of the milk as quickly as possible after it has been milked.

The quickest manner of cooling milk is obtained by milking it straight into a pail or container provided with a cooling medium. Such arrangements are known in which the container is provided with a cooling medium consisting of frozen carbon dioxide that yields an exceedingly cold gas upon evaporation which evaporation is effectuated by the flow of milk into the container. The milk is thus cooled by the evaporating carbon dioxide, and upon the termination of the milking procees the carbon dioxide gas provides a protective layer covering the surface of the milk. The employment of carbon dioxide is due to its properties of having a favourable influence on the keeping qualities of the milk, because it serves to repress the propagation of bacteria and germs.

The method outlined above suffers, however, from various essential drawbacks, the most serious of these being that the low temperature of carbon dioxide, approximately 79° C., produces certain chemical alterations in the milk that contacts directly with either solid carbon dioxide or gaseous carbon dioxide of almost the same low temperature. These chemical reactions have the effect of impairing the taste and the nitritive value of the milk.

Another defect of the method described is that it is comparatively expensive and puts heavy demands on milk producers.

Experience teaches that milk is quickly contaminated by its surroundings. Accordingly, it will be contaminated by containers which, after being cleaned, are rinsed in non-sterilized water, or which have been put aside open in an atmosphere laden with bacilli, or to the interior of which containers flies have had free admittance, notwithstanding quick cooling or the employment of carbon dioxide in the manner described. Even the pouring of milk from one container to another may easily give occasion to contamination of the milk.

The repressing effect of carbon dioxide on the development of bacteria is thus insufficently utilized, because the development of carbon dioxide gas and the filling of the container with this gas take place during the milking process, which for the reasons given does not provide sufficient assurance that the milk is not contaminated with the bacteria that were present in the container before the employment thereof.

According to the present invention the above mentioned drawbacks are eliminated by filling the container intended to be used for the collection of the milk directly from the udder of the cow with carbon dioxide gas before the milking process commences and sealing the gas within the container. As a result the interior of container is protected against infection before the container is used. Preferably the filling of the container with carbon d'oxide gas takes place immediately after the container has been thoroughly cleaned. During the milking process the milk enters the conta'ner and successively displaces the gas, and the carbon dioxide gas provides in known manner a protective layer on the surface of the milk.

This method according to the invention described here offers many advantages, as it is easy to carry out practically and at a low cost, and the preventive properties of the carbon dioxide are utilized in a considerably more efficient manner than in any of the hitherto known methods in which carbon dioxide is employed.

The method is preferably carried out in such a manner that the rece'ver of the milk (the dairy) supplies a closed container filled with a gaseous carbon dioxide to the producer (the farmer), who immediately prior to milking opens the container into which the milk is milked directly from the udder of the cow. The milk flows through a strainer and filter, which is in the container when received. Upon completion of milking the filter is removed and thrown away, the container is closed, and the container shipped back to the receiver. Thus the receiver obtains a product that practically has not been subjected to any danger of contamination.

According to the above the container is cleaned by the receiver (the dairy) only, in whose plant for subsequent treatment of the milk there are more adequate facilities for producing a thorough cleaning than generally will be found with the producer (the farmer). Prior to delivery to the producer the container when clean is filled with a gaseous carbon dioxide and thereupon tightly closed, by which there is provided an efficient protection of the interior of the container against infection for instance from the atmosphere of stables or other compartments where for instance flies abound. There is no possibility that the properly handled container will become infected or the contents of milk contaminated from the moment the container leaves the premises of the receiver till it is again returned thereto with the milk.

The production of a gaseous carbon dioxide within the container may be easily and cheaply effectuated in any known manner by the receiver, and where circumstances demand it a special plant for this purpose may be arranged. Hitherto the producers have each separately been obliged to procure the necessary means for careful cleaning and for the production of gaseous carbon dioxide.

One manner of constructing a container for employment in connection with the method according to the present invention and by means of which the method may be carried out practically is illustrated in the accompanying drawing, which shows a vertical section through a container.

Referring to the drawing the container comprises a cylindrical body 1 on the upper end of which there is attached a comparatively wide neck 2, and at the junction between the body and the neck there is provided an internally protruding ledge 3 that serves as seat for a funnel 4 through the lower narrow aperture 5 of which the milk flows into the interior of the container. To prevent the introduction together with the milk of foreign substances and to provide a closure to prevent the mixing of the exterior atmospheric air with the carbon dioxide gas that is inside the container as described below, there is arranged over the upper end of the funnel 4 a filtering device comprising two gauze sieves 6 and 7 with a cotton filter 8 or the like inserted between them. The container may be closed hermetically in any known manner, for instance by means of a lid 9 provided with clamps for pressing it tightly over the neck 2. The lid is provided with a rubber packing 10 which, when the lid is placed over the neck opening, lies between the lid and the upper edge of the neck.

The clamping device for holding the lid tightly compressed to the container neck may as illustrated comprise two or more clamps 11, each attached by means of a pivot pin 12 to a lug 13 on opposite sides of the exterior of the neck 2. The clamp 11 has a pressure surface 14 which, presses the lid with its interior rubber packing 10 tightly down against the edge of the neck 2. The clamp is provided with a finger catch 15 for operation thereof. When the container is to be opened the clamps 11 are turned back from the lid, which may thereupon be removed.

The container is easy to clean and after cleaning is filled with carbon dioxide gas. This gas may be introduced at any time between the cleaning and the delivery to the producer, but at all events before the milking begins and before the container can be subjected to any infection. The likewise cleaned funnel 4 and filter 6, 8 are then placed on the ledge 3 in the neck and the container may then be closed airtight by means of the lid and the clamping device.

As mentioned the filter device provides a secondary closure against the mixing of the exterior atmospheric air with the carbon dioxide gas inside the container, after the removal of the lid and during the milking process. Carbon dioxide is heavier than atmospheric air and has accordingly no tendency to escape through the filter, but should the container be tilted or upset after the removal of the lid, the outer air cannot penetrate the small opening 5 of the funnel leading to the interior of the container on account of the filter device, and the gas within the container will not escape for the same reason, while the funnel prevents it from escaping along the wall of the neck 2. During milking the milk is practically not exposed to the surrounding air because it is ejected straight from the udder into the neck of the container, which is practically filled with carbon dioxide gas.

When once cleaned and filled with carbon dioxide gas the container may stand over for any length of time as long as it is unopened to prevent the entrance of foreign matter.

I claim:

1. The method of preventing infection of milk incident to the milking operation which comprises sterilizing a container having an opening to atmosphere therein, filling said sterilized container with carbon dioxide gas, milking by hand directly into said opening in the container to effect a flow of displaced carbon dioxide gas in the opposite direction through said same opening against atmospheric pressure, straining the milk and displaced carbon dioxide gas as they pass through said opening whereby the outward flow of carbon dioxide gas through the straining medium prevents the entrance of atmospheric air or foreign material.

2. The method of preventing infection of milk with bacteria in transit from the udder of the cow to a dairy which comprises, sterilizing a combined milking and transport container having an opening to atmosphere therein, filling said sterilized container with carbon dioxide gas, milking by hand directly into said opening in the container to effect a flow of displaced carbon dioxide gas in the opposite direction through said opening against atmospheric pressure, straining the milk and displaced carbon dioxide gas as they pass through said opening whereby the outward flow of carbon dioxide gas through the straining machine prevents the entrance of atmosphere or foreign material, and thereafter closing said opening in the container and transporting the milk therein to the dairy.

ORLA VILHELM JENSEN.